United States Patent
Lemke

(10) Patent No.: US 8,533,896 B2
(45) Date of Patent: Sep. 17, 2013

(54) METHOD AND APPARATUS FOR REMOVING ICE AND SNOW DEPOSITS FROM A VEHICLE

(76) Inventor: James Dennis Lemke, Shoreview, MN (US)

( * ) Notice: Subject to any disclaimer, the term of this patent is extended or adjusted under 35 U.S.C. 154(b) by 147 days.

(21) Appl. No.: 12/930,778

(22) Filed: Feb. 16, 2011

(65) Prior Publication Data
US 2012/0204373 A1   Aug. 16, 2012

(51) Int. Cl.
*B60S 3/04* (2006.01)
*E01H 5/02* (2006.01)
*A47L 13/08* (2006.01)

(52) U.S. Cl.
USPC ......... 15/236.02; 15/236.01; 30/169; 37/285; 294/54.5; D8/10; D32/49

(58) Field of Classification Search
USPC .............. 15/236.01, 236.02, 236.08; 30/169; 37/284, 285, 385; 294/54.5; D32/46–49; D8/10
See application file for complete search history.

(56) References Cited

U.S. PATENT DOCUMENTS

| | | | | |
|---|---|---|---|---|
| 731,762 A * | 6/1903 | Draeger | | 15/236.01 |
| 925,259 A * | 6/1909 | Ziegler | | 15/145 |
| 1,191,810 A * | 7/1916 | Miller | | 294/51 |
| 1,388,931 A * | 8/1921 | Celler | | 30/123 |
| 1,473,143 A * | 11/1923 | Dean | | 15/236.01 |
| 1,484,166 A * | 2/1924 | Wolk | | 30/169 |
| 1,931,926 A * | 10/1933 | Johnson et al. | | 30/169 |
| 2,236,323 A * | 3/1941 | Stachowiak | | 30/169 |
| D156,638 S * | 12/1949 | Lifshutz et al. | | D32/49 |
| 2,639,454 A * | 5/1953 | Dory | | 15/245 |
| 2,946,076 A * | 7/1960 | Morgan | | 15/236.02 |
| 3,088,230 A * | 5/1963 | Bonic | | 37/266 |
| 3,130,436 A * | 4/1964 | Krause et al. | | 15/236.02 |
| 3,571,838 A * | 3/1971 | Staschke | | 15/236.09 |
| D235,965 S * | 7/1975 | Grinnell et al. | | D32/49 |
| 4,141,111 A | 2/1979 | Hopkins | | |
| D305,468 S | 1/1990 | Yonkers | | |
| D345,640 S | 3/1994 | Galati | | |
| D355,286 S | 2/1995 | Wallace | | |
| D373,863 S | 9/1996 | Shepherd | | |
| 5,606,761 A * | 3/1997 | Lynch | | 15/144.4 |
| 5,983,504 A * | 11/1999 | Tisbo et al. | | 30/164.5 |
| 6,237,225 B1 * | 5/2001 | Tarrant | | 30/169 |
| D484,655 S | 12/2003 | Anderson | | |
| D485,032 S | 1/2004 | Anderson | | |
| 6,969,828 B2 | 11/2005 | Deane | | |
| D547,627 S * | 7/2007 | Meads | | D8/45 |
| 7,695,036 B2 * | 4/2010 | Smetana | | 294/54.5 |
| D617,158 S | 6/2010 | Smith | | |
| 2007/0085359 A1 | 4/2007 | Schouten | | |
| 2007/0130715 A1 | 6/2007 | Marion | | |
| 2007/0186450 A1 * | 8/2007 | Payton | | 37/285 |

* cited by examiner

*Primary Examiner* — Mark Spisich
(74) *Attorney, Agent, or Firm* — Christian J. Girtz

(57) ABSTRACT

A method and apparatus for removing ice and snow deposits from a vehicle during winter snow season. A hand-operated device for removing ice and snow deposits from a vehicle generally includes a handle, a blade, and one or more fasteners. A slotted aperture on an end of the handle is adapted to receive a coupling portion of the blade. Fasteners are positioned through the handle and blade at the slotted aperture to secure the handle and blade. The device enables a user to separate ice and snow deposits from a vehicle without damaging the vehicle.

10 Claims, 2 Drawing Sheets

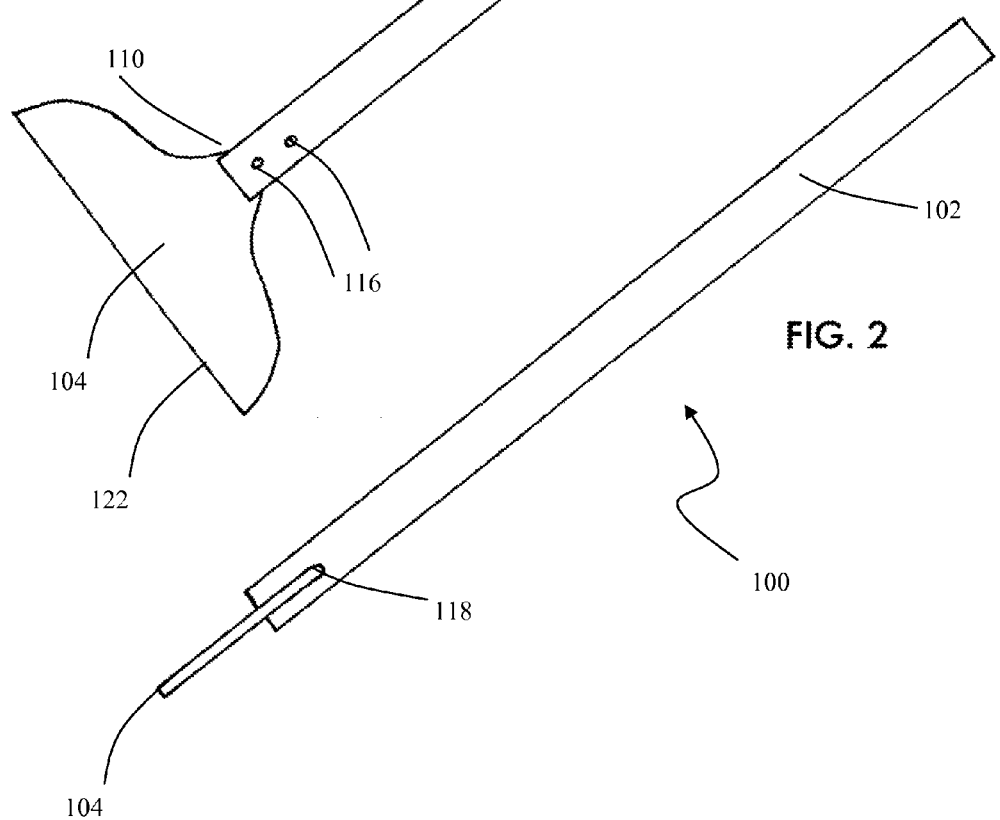

METHOD AND APPARATUS FOR REMOVING ICE AND SNOW DEPOSITS FROM A VEHICLE

RELATED APPLICATION

The present application claims the benefit of U.S. Provisional Application No. 61/336,945, filed Jan. 11, 2011, which is incorporated herein by reference in its entirety.

TECHNICAL FIELD

The invention relates generally to snow removal tools. More particularly, the invention relates to hand-operated snow removal tools for vehicles.

BACKGROUND

A problem exists for the drivers of vehicles who drive in snowy and icy conditions. Chunks of ice and snow deposits can collect and become wedged in wheel wells, behind tires, and under the outside edges of the vehicles. If these deposits are not removed prior to entering a garage or other heated area, the deposits can melt and create a wet and messy surrounding area. Therefore, there is a need for tools and methods to aid in safely removing chunks of ice and snow deposits from vehicles.

SUMMARY OF THE INVENTION

Embodiments of the present application substantially meet the aforementioned needs of the industry. In an embodiment, this functional, novelty, lightweight, but sturdy snow removal tool is made from U.S.A. components, assembled in Minnesota. It consists of a predetermined handle with a hanging hole on one end. The other end of the handle has a slot cut in to contain a predetermined sturdy, flexible and replaceable scraper blade secured by two nylock nuts screwed onto two bolts after they are fitted into two matching holes that are drilled in the handle and scraper blade.

Embodiments can be used to quickly and easily remove chunks of ice and snow deposits that collect and get wedged in wheel wells, behind tires, and under the outside edges of a vehicle between front and back tires. In an embodiment, the tool handle is held by two hands in order to effectively scrape off the ice and snow deposits on a vehicle prior to entering a garage, thus helping to reduce wet and messy garage floors from the melting of the ice and snow deposits that can occur during the winter snow season.

In an embodiment, the tool includes a 48"×1¼" handle that incorporates a 10" pliable plastic blade fitted into one end of the handle in a special cut slot and secured by two nylock nuts and bolts. The other end of the handle features a ¼" hanging hole for easy storage on a wall, if desired. In embodiments, the handle can be made of wood.

In an embodiment, the tool consists of a 48" long×1¼" diameter wood dowel handle with a hanging hole on one end. The other end of the handle has a 4⅛" slot cut in to contain a 10" sturdy plastic scraper blade secured by two nylock nuts screwed onto two 1½" machine bolts that are fitted into two matching holes that are drilled in the wood handle and scraper blade.

In a feature and advantage of embodiments of the invention, damage to shoes and boots is prevented because there is no longer a need to try and kick off and remove ice and snow deposits from a vehicle prior to entering a garage.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1 is a top plan view of an assembled utility tool, according to an embodiment;

FIG. 2 is a side elevation of the tool of FIG. 1; and

Figure 3:
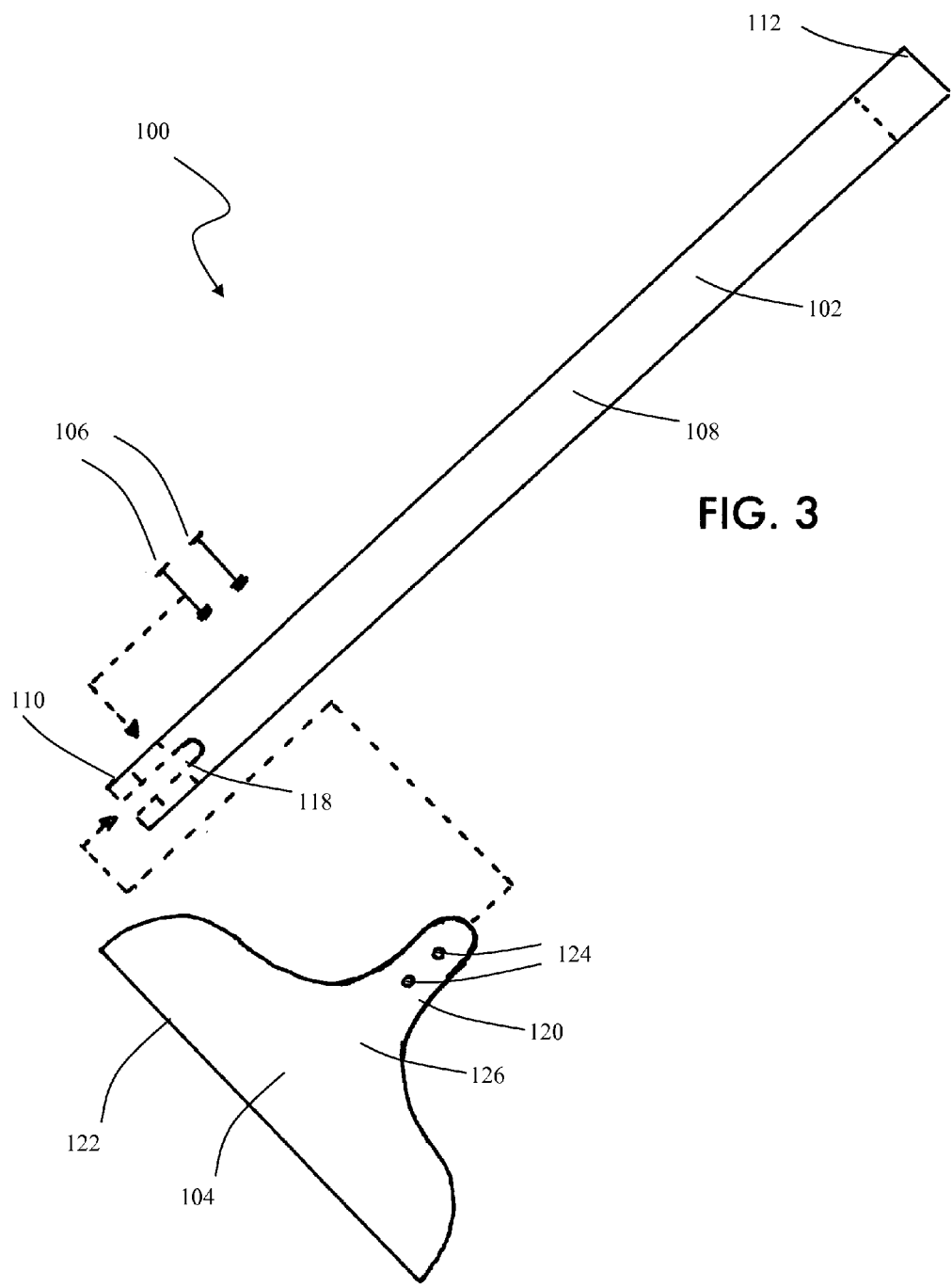
FIG. 3 is an exploded view of the tool of FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring generally to FIGS. 1-3, a hand-operated device 100 for removing ice and snow deposits from a vehicle, according to an embodiment, is depicted. Device 100 generally includes handle 102, blade 104, and one or more fasteners 106.

Handle 102 comprises an elongated portion 108 having a first end 110 and a second end 112. Elongated portion 108 spans from first end 110 to second end 112 and is adapted to be gripped by a human hand. In other embodiments, elongated portion is adapted to be gripped by two human hands.

First end 110, in an embodiment, comprises one or more apertures 116 adapted to receive one or more fasteners 106. First end 110 further comprises slot 118. Slot 118 comprises a void in the center of first end 110 such that solid portions of handle 102 project on either side of slot 118. Slot 118 is therefore configured to receive portions of blade 104. In an embodiment, slot 118 can comprise a 4⅛" void.

Optionally, second end 112, in an embodiment, comprises aperture 114. In an embodiment, aperture 114 can be a ¼" hole adapted to receive a hanging loop for easy storage on a hook, if desired. In embodiments, aperture 114 is adapted to receive a finishing nail.

In embodiments, handle 102 can be made of wood. In embodiments, handle 102 can comprise a dowel measuring 48" long×1¼" diameter.

Blade 104 comprises a coupling portion 120 and an edge portion 122. A span from edge portion 122 to coupling portion 120 creates a blade body 126 having surface area that further enables the removal of ice and snow deposits by providing a surface for ice and snow to be pushed or scraped away. In an embodiment, coupling portion 120 can be rounded at one end, as illustrated in FIG. 3. Coupling portion 120 comprises blade apertures 124 adapted to receive one or more fasteners 106. Coupling portion 120 is adapted to be inserted in slot 118 of handle 102 at first end 110 such that once in place, one or more apertures 116 align with blade apertures 124.

Edge portion 122 comprises a flat edge for scraping various portions of a vehicle. In embodiments, coupling portion 120 can comprise curved edges from the distal ends of edge portion 122 to the rounded end of coupling portion 120, as illustrated in FIG. 3.

In an embodiment, blade 104 is composed of sturdy plastic and contains a 10" edge portion 122.

One or more fasteners 106 are adapted to secure handle 102 to blade 104. In an embodiment, one or more fasteners 106 are configured to be received by one or more apertures 116, received through blade 104 and particularly, blade apertures 124 at slot 118, to operably couple handle 102 to blade 104. In an embodiment, one or more fasteners 106 comprise two nylock nuts screwed onto two 1½" machine bolts.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A hand-operated device for removing ice and snow deposits from a vehicle, the device comprising:
a blade including—
a. coupling portion having at least one blade aperture,
an edge portion adapted to interface with the vehicle, and
a blade body spanning between the coupling portion and the edge portion,
two intermediate edges, each intermediate edge spanning on opposite sides of the blade body from a distal tip of the coupling portion to the edge portion,
wherein the distance between the edge portion and the distal tip of the coupling portion defines a blade height, and the distance across the edge portion defines a blade width, wherein the blade height is less than the blade width;
a handle adapted to be gripped by a human hand, the handle including—
a straight, non-bent elongated member having, a slotted aperture on a first end, the slotted aperture adapted to receive the coupling portion,
at least one handle aperture perpendicular to and passing through the slotted aperture; and
one or more fasteners coupling the blade to the handle by passage through the at least one handle aperture and the at least one blade aperture when the coupling portion is within the slotted aperture,
wherein each intermediate edge comprises a concave edge surface proximal a juncture of the first end of the elongated member and the blade body, and a convex edge surface proximal a juncture of the blade body and the edge portion, and wherein the edge portion and the blade body are configured to scrape ice and snow deposits from the vehicle by force exerted by the human hand on the handle.

2. The hand-operated device of claim 1, wherein the blade is comprised of a plastic material.

3. The hand-operated device of claim 1, wherein the edge portion is about 10 inches long.

4. The hand-operated device of claim 1, wherein the at least one blade aperture comprises two blade apertures.

5. The hand-operated device of claim 1, wherein the handy further comprises a second end including a hanging aperture.

6. The hand-operated device of claim 1, wherein the handle is comprised of a wood material.

7. The hand-operated device of claim 1, wherein the handle is about 48 inches long.

8. The hand-operated device of claim 1, wherein the one or more fasteners comprise two nylock nuts screwed onto two 1½ inch machine bolts.

9. The hand-operated device of claim 1, wherein handle is further adapted to be gripped by two human hands, and wherein the edge portion and the blade body are configured to scrape the ice and snow deposits from the vehicle by force exerted by two human hands on the handle.

10. A method of removing ice and snow deposits from a vehicle, the vehicle comprising a front tire find a back tire, a front wheel well enclosing the front tire, a back wheel well enclosing the back tire, and a vehicle body spanning between the front tire and the back tire and having vehicle paint, the method comprising:
providing a hand-operated device for removing ice and snow deposits from the vehicle, the device comprising:
a blade including—
a coupling portion having at least one blade aperture,
an edge portion adapted to interface with the vehicle, and
a blade body spanning between the coupling portion and the edge portion,
two intermediate edges, each intermediate edge spanning on opposite sides of the blade body from a distal tip of the coupling portion to the edge portion,
wherein the distance between the edge portion and the distal tip of the coupling portion defines a blade height, and the distance across the edge portion defines a blade width, wherein the blade height is less than the blade width;
a handle adapted to be gripped by a human hand, the handle including—
a straight, non-bent elongated member having a slotted aperture on a first end, the slotted aperture adapted to receive the coupling portion,
at least one handle aperture perpendicular to and passing through the slotted aperture; and
one or more fasteners coupling the blade to the handle by passage through the at least one handle aperture and the at least one blade aperture when the coupling portion is within the slotted aperture,
wherein each intermediate edge comprises a concave edge surface proximal a juncture of the first end of the elongated member and the blade body, and as convex edge surface proximal a juncture of the blade body and the edge portion, and wherein the edge portion and the blade both are configured to scrape ice and snow deposits from the vehicle by force exerted by the human hand on the handle;
holding the device by the handle with two hands;

applying the edge portion of the blade to the front wheel well to separate ice and snow deposits from the front wheel well;

applying the edge portion of the blade to the back wheel well to separate ice and snow deposits from the back wheel well; and applying the edge portion of the blade to the vehicle body to separate ice and snow deposits from the vehicle body without damaging the vehicle paint or the vehicle body.

\* \* \* \* \*